US009003377B2

(12) United States Patent
Gafter et al.

(10) Patent No.: US 9,003,377 B2
(45) Date of Patent: Apr. 7, 2015

(54) EFFICIENT RESUMPTION OF CO-ROUTINES ON A LINEAR STACK

(75) Inventors: Neal M. Gafter, San Jose, CA (US); Mads Torgersen, Issaquah, WA (US); Henricus Johannes Maria Meijer, Mercer Island, WA (US); Niklas Gustafsson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1076 days.

(21) Appl. No.: 12/683,447

(22) Filed: Jan. 7, 2010

(65) Prior Publication Data

US 2011/0167248 A1    Jul. 7, 2011

(51) Int. Cl.
*G06F 9/44* (2006.01)

(52) U.S. Cl.
CPC .................................. *G06F 9/4426* (2013.01)

(58) Field of Classification Search
CPC .............. G06F 12/0253; G06F 12/023; G06F 2201/86; G06F 2201/865; G06F 12/0269
USPC .......................................... 712/242; 717/114
See application file for complete search history.

(56) References Cited

U.S. PATENT DOCUMENTS

| 4,667,290 A * | 5/1987 | Goss et al. ..................... 717/147 |
| 5,295,256 A | 3/1994 | Bapat |
| 5,530,870 A * | 6/1996 | De Bruler ..................... 717/155 |
| 5,615,332 A * | 3/1997 | Yamamoto ................. 714/38.13 |
| 5,630,131 A | 5/1997 | Palevich |
| 5,758,153 A | 5/1998 | Atsatt |
| 6,006,230 A | 12/1999 | Ludwig |
| 6,018,628 A | 1/2000 | Stoutamire |
| 6,141,723 A | 10/2000 | Lyons |
| 6,212,630 B1 * | 4/2001 | Takayama et al. ............ 712/242 |
| 6,298,434 B1 | 10/2001 | Lindwer |
| 6,311,327 B1 | 10/2001 | O'Brien |
| 6,453,356 B1 | 9/2002 | Sheard |
| 6,564,265 B2 | 5/2003 | Tillmann |
| 6,826,763 B1 | 11/2004 | Wang |

(Continued)

FOREIGN PATENT DOCUMENTS

WO         9727536 A1      7/1997

OTHER PUBLICATIONS

Niccolai, Giancarlo, "The Falcon Programming Language", Retrieved at <<http://falconpl.org/docs/pdf/0.8.14/survival.pdf>> 2008, pp. 1-125.

(Continued)

*Primary Examiner* — Jue Louie
*Assistant Examiner* — Sergio J Curbelo, III
(74) *Attorney, Agent, or Firm* — Kate Drakos; Micky Minhas

(57) ABSTRACT

Unsuspended co-routines are handled by the machine call stack mechanism in which the stack grows and shrinks as recursive calls are made and returned from. When a co-routine is suspended, however, additional call stack processing is performed. A suspension message is issued, and the entire resume-able part of the call stack is removed, and is copied to the heap. A frame that returns control to a driver method (a resumer) is copied to the call stack so that resumption of the co-routine does not recursively reactivate the whole call stack. Instead the resumer reactivates only the topmost or most current frame called the leaf frame. When a co-routine is suspended, it does not return to its caller, but instead returns to the resumer that has reactivated it.

20 Claims, 4 Drawing Sheets

(56) References Cited

U.S. PATENT DOCUMENTS

| | | | |
|---|---|---|---|
| 7,150,004 B2 | 12/2006 | Russell | |
| 7,181,732 B2 | 2/2007 | Bak | |
| 7,225,201 B1 | 5/2007 | Milby | |
| 7,278,137 B1 | 10/2007 | Fuhler | |
| 7,322,045 B2 | 1/2008 | Kiddy | |
| 7,577,961 B1* | 8/2009 | Bissett et al. | 719/318 |
| 7,661,096 B2 | 2/2010 | Meijer | |
| 7,937,694 B2 | 5/2011 | Meijer | |
| 2002/0073133 A1* | 6/2002 | Misaka et al. | 709/102 |
| 2002/0095658 A1 | 7/2002 | Shulman | |
| 2002/0108103 A1 | 8/2002 | Nevill | |
| 2002/0129344 A1 | 9/2002 | Chen | |
| 2002/0144141 A1* | 10/2002 | Edwards et al. | 713/200 |
| 2002/0188931 A1* | 12/2002 | Ewart et al. | 717/154 |
| 2003/0014737 A1* | 1/2003 | Smith et al. | 717/130 |
| 2003/0033039 A1 | 2/2003 | Gutberlet | |
| 2004/0015907 A1 | 1/2004 | Giel | |
| 2004/0015920 A1* | 1/2004 | Schmidt | 717/153 |
| 2004/0073764 A1* | 4/2004 | Andreasson | 711/170 |
| 2004/0128672 A1 | 7/2004 | Beatty | |
| 2004/0194058 A1 | 9/2004 | Meijer | |
| 2004/0255018 A1 | 12/2004 | Taraci | |
| 2005/0081016 A1 | 4/2005 | Sakai et al. | |
| 2005/0183071 A1 | 8/2005 | Meijer | |
| 2006/0150194 A1* | 7/2006 | Xing et al. | 718/108 |
| 2008/0222401 A1* | 9/2008 | Dewey et al. | 712/228 |
| 2009/0222798 A1 | 9/2009 | Iguchi et al. | |
| 2010/0115530 A1* | 5/2010 | Ahmad et al. | 718/108 |

OTHER PUBLICATIONS

Haskin, Roger L., "The Shark Continuous-Media File Server", Retrieved at <<http://www.almaden.ibm.com/storagesystems/projects/gpfs/gpfs-ts/Cmpcon93.pdf>> In the Proceedings of Compcon Spring '93, Digest of Papers, Feb. 22-26, 1993, pp. 4.

Jacobs et al., "Iterators revisited: proof rules and implementation", Retrieved at <<http://www.cs.kuleuven.be/~frank/PAPERS/FTfJP2005.pdf>> 2005, pp. 21.

U.S. Appl. No. 11/045,705, Notice of Allowance dated Jul. 20, 2009, 16 pages.

Fegaras et al. "Optimizing Object Queries Using an Effective Calculus", Dec. 2000, ACM, TODS vol. 25, Issue 4, pp. 457-516.

Ives et al. "An XML query engine for network-bound data" Dec. 2002, 30 pages.

Hartel et al. "Formalizing the safety of Java, the Java virtual machine, and Java card", Dec. 2001, 52 pages.

U.S. Appl. No. 10/778,793, Non-Final Rejection dated Aug. 2, 2007, 15 pages.

U.S. Appl. No. 10/778,793, Amendment dated Nov. 2, 2007, 13 pages.

U.S. Appl. No. 10/778,793, Non-Final Rejection dated Jan. 22, 2008, 23 pages.

U.S. Appl. No. 10/778,793, Amendment dated Mar. 31, 2008, 9 pages.

U.S. Appl. No. 10/778,793, Final Rejection dated Jul. 9, 2008, 17 pages.

U.S. Appl. No. 10/778,793, Amendment After Final Rejection dated Sep. 5, 2008, 14 pages.

U.S. Appl. No. 10/778,793, Non-Final Rejection dated Nov. 6, 2008, 18 pages.

U.S. Appl. No. 10/778,793, Amendment dated Apr. 6, 2009, 14 pages.

U.S. Appl. No. 10/778,793, Final Rejection dated Jul. 16, 2009, 26 pages.

U.S. Appl. No. 10/778,793, Amendment After Final Rejection dated Nov. 16, 2009, 15 pages.

U.S. Appl. No. 10/778,793, Non-Final Rejection dated Dec. 9, 2009, 21 pages.

U.S. Appl. No. 10/778,793, Amendment dated Apr. 9, 2010, 15 pages.

U.S. Appl. No. 10/778,793, Final Rejection dated Jul. 12, 2010, 27 pages.

U.S. Appl. No. 10/778,793, Amendment After Final Rejection dated Dec. 13, 2010, 17 pages.

U.S. Appl. No. 10/778,793, Notice of Allowance dated Dec. 23, 2010, 6 pages.

Bender, "Using a Stack to Implement Recursion", Apr. 2000, downloaded from <http://mitpress.mit.edu/sicp/fulltextlsicp/ book/node110.html>, 5 pages.

Blelloch et al., "Implementation of a Portable Nested Data Parallel Language", Feb. 1993 School of Computer Science, Carnegie Mellon University, 31 pages.

Yang,"Interface, IEnumerable and IEnumerator in C#", May 15, 2002, available at <http://www.devarticles.com/c/a/C-Sharp/Interface-IEnumerable-and-IEnumerator-in-C-sharp/> as of Jul. 9, 2009, 1 page.

"Turing Completeness", wikipedia Retrieved Jul. 8, 2009 from <http://en.wikipedia.org/wikilTuring_completeness>, 4 pages.

Mertz, "Charming Python #b13: The itertools Module, Functional programming in Python becomes lazy", 2003 available at <http://gnosis.cx/publish/programming/charming_python_b13.html> as of Jul. 9, 2009, 6 pages.

"Lazy evaluation," Wikipedia, 4 pages, Retrieved Mar. 24, 2009, from <http://en.wikipedia.org/wiki/Lazy_evaluation>.

"Standard streams," Wikipedia, 5 pages, Retrieved Mar. 24, 2009, from <http://en.wikipedia.org/wiki/Standard_streams>.

"Stream (computing)0," Wikipedia, 1 page, Retrieved Mar. 24, 2009, from <http://en.wikipedia.org/wiki/Stream (computing>.

"Stream Class," msdn, 2 pages, Retrieved Mar. 24, 2009, from <http://msdn.microsoft.com/en-us/library/system.io.stream.read(VS.71).aspx>.

"Yet Another Language Geek. All About Iterators," Welcome to MSDN Blogs, 11 pages, Retrieved Mar. 24, 2009, from <http://blogs.msdn.com/wesdyer/archive/2007/03/23/allabout-iterators-aspx>.

Jacobs et al., "Iterators Revisited: proof rules and implementation," Workshop on Formal Techniques for Java-like Programs 2005, 21 pages.

ASPRelated.com, "Iteration statements," 6 pages. [Downloaded from the World Wide Web on Jan. 29, 2004.].

ASPRelated.com, "Iterator blocks," 2 pages. [Downloaded from the World Wide Web on Jan. 29, 2004.].

ASPRelated.com, "Enumerator objects," 4 pages. [Downloaded from the World Wide Web on Jan. 29, 2004.].

ASPRelated.com, "Enumerable objects," 2 pages. [Downloaded from the World Wide Web on Jan. 29, 2004.].

ASPRelated.com, "The yield statement," 3 pages. [Downloaded from the World Wide Web on Jan. 29, 2004.].

Microsoft Corporation, "Iterators in C#," 3 pages. (Downloaded from the World Wide Web on Jan. 29, 2004.].

Microsoft Corporation, "yield," 2 pages. [Downloaded from the World Wide Web on Jan. 29, 2004.].

Microsoft Corporation, "foreach, in," 2 pages. (Downloaded from the World Wide Web on Jan. 29, 2004.].

Allen et al., "When to Use Recursion/When to Use Iteration," 2 pages. [Downloaded from the World Wide Web on Feb. 1, 2004.].

Microsoft Corporation, "C# Iterators, Draft 3," pp. 1-14, Sep. 2003.

Meijer et al., "Unifying Tables, Objects and Documents," 24 pp. [Downloaded from the World Wide Web on Jan. 29, 2004.].

Microsoft Corporation, "The C# Programming Language, Future Features," pp. 1-15. [Downloaded from the World Wide Web on Jan. 29, 2004.].

Guido vanRossum "Flattening Python Objects", 1994, downloaded from http://www.python.org/workshops/1994-11/FlattenPython.html on Jul. 21, 2007, 5 pages.

Guido vanRossum "Flattening Algorithm", 1994, downloaded from http://www.python.org/workshops/1994-11fflatten.py on Jul. 21, 2007, 10 pages.

Raymond Toy "5.5 Tail Recursion", 1997, downloaded from http:www.umiacs.umd.edu/-resniklling645_sp2002/cmu_manuallnode140.html on Jul. 21, 2007, 3 pages.

Dyer, "All About Iterators," downloaded from http://blogs.msdn.com/b/wesdyer/archive/2007/03/23/all-about-iterators.aspx, 9 pages (document marked Mar. 23, 2007), 9 pages.

U.S. Appl. No. 11/045,705, Non-Final Rejection dated Sep. 27, 2007, 12 pages.

(56) References Cited

OTHER PUBLICATIONS

U.S. Appl. No. 11/045,705, Amendment dated Mar. 25, 2008, 10 pages.
U.S. Appl. No. 11/045,705, Final Rejection dated Jul. 11, 2008, 22 pages.
U.S. Appl. No. 11/045,705, Amendment After Final Rejection dated Sep. 11, 2008, 9 pages.
U.S. Appl. No. 11/045,705, Advisory Action dated Oct. 3, 2008, 3 pages.
U.S. Appl. No. 11/045,705, Amendment After Final Rejection dated Nov. 26, 2008, 8 pages.
U.S. Appl. No. 11/045,705, Non-Final Rejection dated Dec. 23, 2008, 16 pages.
U.S. Appl. No. 11/045,705, Amendment dated Mar. 27, 2009, 9 pages.
Chinese Patent Application No. 201110008477.0, Office Action dated Mar. 31, 2014, 14 pages (including English translation).
Chinese Patent Application No. 201110008477.0, English translation of Summary of First Office Action, 1 page.
Chinese Patent Application No. 201110008477.0, Amendment dated Aug. 6, 2014, 17 pages (including English translation of claims).
Chinese Patent Application No. 201110008477.0, Second Office Action dated Dec. 4, 2014, 11pages (including English translation).

* cited by examiner

EFFICIENT RESUMPTION OF CO-ROUTINES ON A LINEAR STACK

BACKGROUND

In computer science, co-routines are program components that typically generalize subroutines and may allow multiple entry points for suspending and resuming execution. Co-routines are sometimes used to implement cooperative tasks, iterators, infinite lists and pipes. While a subroutine is typically a last-in, first-out construct, the lifespan of a co-routine can be dictated by its use. While a subroutine can return only once; a co-routine can return or yield more than once. While the start of a subroutine is usually its only point of entry, the start of a co-routine is the first point of entry and subsequent points of entry can follow yield commands. For example, like a subroutine, yielding in a co-routine can return the result and control to the calling co-routine but, unlike a subroutine, the next time the co-routine is called, execution can start just after the yield call instead of at the beginning of the co-routine.

Because a co-routine can return multiple times, it is possible to return additional values upon subsequent calls. Co-routines in which subsequent calls yield additional results are often called generators. Traditional subroutines use a single stack that can be pre-allocated at the beginning of program execution. In contrast, because co-routines are able to call on other co-routines as peers, typically additional stacks are allocated for co-routines. Sometimes, stacks are pre-allocated or previously allocated stacks are cached.

Generators also generalize subroutines, and are often used to simplify the writing of iterators. The yield statement in a generator typically does not specify a co-routine to jump to, but instead passes a value back to a parent routine. However, it is still possible to implement a co-routine on top of a generator facility, with the aid of a top-level dispatcher routine that passes control explicitly to child generators identified by tokens passed back from the generators.

Many popular programming languages, including C, C++ and C#, do not have direct support for co-routines within the language, due to the limitations of stack-based subroutine implementation. In situations in which a co-routine would logically be used to implement a mechanism, were it available, typically a subroutine is created that uses a combination of boolean flags and other state variables to maintain internal state between calls. Conditional statements result in the execution of different code paths based on the values of the state variables. Alternatively, an explicit state machine in the form of a switch statement is implemented.

An approach providing an alternative to use of co-routines is use of threads. Threads provide the ability to manage real time cooperative interaction of substantially simultaneously executing pieces of code. Threads are typically preemptively scheduled. Co-routines typically are not. Because threads can be rescheduled at any instant and can execute concurrently, programs using threads have to be careful about locking. In contrast, because co-routines can only be rescheduled at specific points in the program and do not execute concurrently, programs using co-routines can often avoid locking issues entirely.

One approach to implementing co-routines in high level languages abandons portability. Instead, processor-family-specific implementations are written in assembly for functions to save and restore a co-routine context. Care has to be taken in the use and writing of these functions so that variables located on the stack are not overwritten, when co-routines share the same stack. Thus, typically, for stack-based co-routines in high level languages, functions are needed to create and jump between alternate stacks. A third machine-specific function can be provided to create the context for a new co-routine. Traditionally, the stack size for the co-routine is fixed and cannot grow during execution. Often, programs allocate a larger stack than needed to avoid potential stack overflow.

SUMMARY

In a computer system that uses a single linear machine call stack for execution in a language without direct co-routine support, a driver routine controls co-routine execution. When a co-routine is initially called by another co-routine, the called co-routine is placed on top of the caller's frame on the stack. The first time a co-routine is suspended, all of its stack frames down to and including the driver stack frame are copied into the heap. If, however, the co-routine is suspended again, its stack frames are not copied to the heap again. When the co-routine is resumed, the driver routine only puts the leaf routine on the stack. Though a single suspension in this approach will cost O(d) for a stack of depth d, since every frame is only copied to the heap once, the total amortized cost of this approach is O(m) where m is the number of frames that are ever suspended, and m is typically smaller than n, the number of total frames called.

If an exception is thrown in the leaf routine, the driver routine detects or catches the exception. The driver replaces the stack frame associated with the callee (called) leaf routine with the stack frame associated with the caller on the stack. The driver executes the calling routine, and the exception is thrown again.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
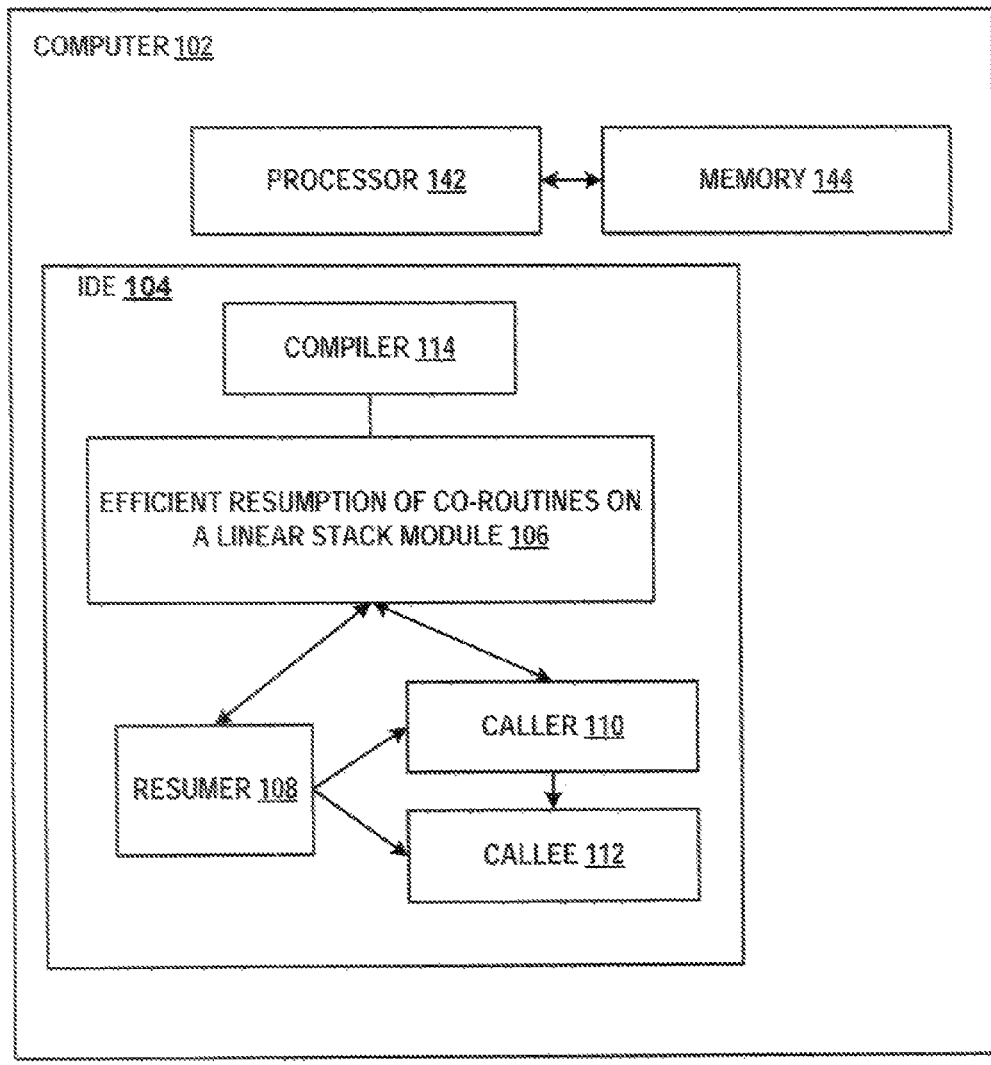
FIG. 1 illustrates an example of a system 100 for efficient resumption of co-routines on a linear stack in accordance with aspects of the subject matter disclosed herein.

In accordance with aspects of the subject matter disclosed herein, unsuspended co-routines are handled by a call stack mechanism in which the stack grows and shrinks as calls are made and returned from. The first time a co-routine is suspended, however, additional call stack processing is performed. A suspension message is issued, and the entire resume-able part of the call stack is removed from the machine call stack, and is copied to the heap. A frame that returns control to a driver method (a resumer) is copied to the call stack so that resumption does not recursively re-activate the whole call stack. Instead the resumer reactivates only the topmost or most current frame called the leaf frame. When a co-routine is suspended, it does not return to its caller, but instead returns to the resumer that has reactivated it, the resumer retrieving the appropriate address to which to return control.

The state machine transformations performed by the compiler do not loop to repeatedly reactivate a callee until the callee returns. From the point of view of the calling state machine, when a callee returns, it returns either synchronously, in which case the result (or exception) is consumed naturally and processing proceeds or the return comprises a suspension, in which case processing is suspended with the expectation that processing will not resume until the callee is done and a resumer returns its results.

Efficient Resumption of Co-Routines on a Linear Stack

The term co-routine is a general term for a sequence of actions. A co-routine is similar to a procedure except that, unlike a procedure, a co-routine can be paused (suspended) during execution and resumed later. Resumption can be initiated by a client requesting output from the co-routine. For example, in some programming languages an iterator can be implemented as a co-routine whose task is to produce elements of a collection on demand. Once the co-routine has produced an element of the collection, it pauses. The co-routine resumes when the next element is wanted. This process is continued until no more elements are wanted or until all the elements in the collection have been produced.

Resumption can be driven or initiated by input becoming available. For example, a co-routine can be paused at a point when requested data is not available, as may occur when data is requested over a longer latency channel (e.g., reading from disk or accessing information from a network, etc.). Resumption may be initiated by a call back or event or may be otherwise triggered when requested data becomes available. This type of scenario is likely to be found when asynchronous programming techniques are employed.

Typically, when one procedure calls another, the calling procedure waits for the result and then calls the next one, waits for its result and so on. In contrast, one or more co-routines can be called from another co-routine recursively, to whatever depth of recursion. When a first co-routine calls a second co-routine in a recursive call chain of co-routines, the first co-routine is paused when the second co-routine is paused and so on.

Recursive procedure calls and subroutine calls are traditionally implemented via a low-level data structure called a machine call stack (also known as an execution stack, control stack, function stack or run-time stack). The call stack keeps track of the point to which each active callee returns control when it finishes executing. An active callee is one that has been called but has not yet completed executing by returning to the caller. The callee pushes the return address of the caller onto the stack and, when the callee is finished, the callee pops the return address off the stack, and transfers control to the address popped off the stack. Thus, information placed on the stack grows and shrinks as a program executes. The call stack described automatically supports recursion in a serial world. Depending on the language, operating system and machine environment, the call stack may serve additional functions including storing local data, parameters, logical operations, a pointer to a current instance (a this pointer), an enclosing routine context and return state.

The machine call stack data structure is composed of stack frames, machine-dependent data structures containing callee state information. Each stack frame corresponds to a call to a subroutine which has not yet terminated with a return. The stack frame at the top of the call stack (leaf frame) holds the information for the currently executing subroutine. The return address provided by the subroutine call instruction to a callee is saved by the callee pushing the value onto the call stack. When a callee returns, the entire stack frame is popped off the stack and control is returned to the instruction located at the return address. Typically, one call stack is associated with each task or thread of a process.

In high level programming language environments, the programmer is typically not allowed to manipulate the memory of the call stack. Typically the programmer is given access only to a list of functions to be performed on the stack. Implementations of C and C++ use a single linear (contiguous) stack as storage for stack frames. A procedure call pushes the return address onto the stack, and the callee allocates space on the stack for its own local variables, etc. The linear stack mechanism works efficiently in a serial world. However, inherently the linear stack is not able to handle co-routines that suspend and resume in a non-serial fashion. Hence to implement co-routine calls on a platform that does not support suspension and resumption of co-routines at a machine call stack level, additional processing that does handle the suspension and resumption of co-routines is sometimes employed.

In the traditional implementation of co-routines for a computer system that uses a single linear machine call stack for execution in a language without direct co-routine support, a co-routine is suspended by storing the stack frames that are associated with the co-routine on the machine call stack into a heap that emulates the machine call stack. The heap is a region of memory reserved for objects and is separate from the machine call stack. When the co-routine is resumed, all of the stack frames associated with the co-routine are reconstituted from the heap back onto the machine call stack. Consequently, when the depth of the co-routines associated with the co-routine on the machine call stack is d, the time to perform one step of a co-routine (resume it, perform some part of its computation, and then suspend it again) is at least O(d). If a co-routine is not suspended, the stack frames associated with the co-routine on the machine call stack are not copied to the heap.

Another known approach copies a co-routine's stack frames from the machine call stack to the heap that emulates the machine call stack each time the co-routine is called instead of waiting until the co-routine has suspended. A driver routine controls co-routine execution. In this approach, at any given time, only two stack frames associated with the co-routine are on the machine call stack. The two stack frames associated with the co-routine that are on the machine call stack are: the driver routine and a stack frame representing the execution of the leaf routine of the co-routine. The leaf routine is the topmost stack frame associated with the co-routine. When the leaf routine suspends, the topmost stack frame is removed from the machine call stack and is stored on the heap. When execution of the leaf routine resumes, the stored stack frame for the leaf routine is reconstituted onto the machine call stack. When the leaf routine finishes executing and returns to its caller, the driver routine puts the caller's stack frame on top of the stack as the new leaf. If any currently executing leaf routine calls another routine, the driver routine replaces the currently executing leaf routine with a new leaf routine representing the callee (the called routine) on the call stack. The driver keeps track of who calls whom in the heap and the order in which co-routines are called. The second approach allows co-routines to be called, suspended, resumed and returned from in constant time. However, all the co-routine stack frames are copied to the heap at least once, even when a co-routine is not suspended.

In accordance with aspects of the subject matter disclosed herein, frames are only copied to the heap if they are actually ever suspended. Moreover, a given frame is only copied to the heap once. A driver routine is at the bottom of the co-routine's part of the stack. When a co-routine is initially called by another co-routine, the called co-routine will not replace its caller on the stack, (so that the called co-routine's frame would then reside directly on top of the driver routine). Instead, the called routine will be called in the manner of a normal subroutine, with the called routine's frame placed on top of the caller's frame on the stack. When suspended for the first time, every frame on the stack down to the driver routine is copied to the heap. When resuming, the driver routine only puts the leaf routine back on the stack, and handles returning and throwing exceptions by replacing the callee frame with the caller frame on the stack. Although a single suspension in this approach will cost O(d) for a stack of depth d, since every frame is only copied to the heap once, the total amortized cost of this approach is O(m) where m is the number of frames that are ever suspended. m is typically smaller than n, the number of total frames called.

FIG. 1 illustrates an example of a system 100 for efficient resumption of co-routines on a linear stack in accordance with aspects of the subject matter disclosed herein. All or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated development environment (e.g., IDE 104) such as the ones described and illustrated below with respect to FIG. 4. Alternatively, system 100 or portions thereof may be provided as a stand-alone system or as a plug-in or add-in.

System 100 may include one or more of: a processor (such as processor 142), a memory 144, and a module for efficient resumption of co-routines on a linear stack 106. Other components well known in the arts may also be included but are not here shown. It will be appreciated that the module for efficient resumption of co-routines on a linear stack 106 can be loaded into memory 144 to cause one or more processors such as processor 142 to perform the actions attributed to the module for efficient resumption of co-routines on a linear stack 106. The module for efficient resumption of co-routines on a linear stack 106, in accordance with aspects of the subject matter disclosed herein, may receive or generate a notification of a suspend or resume for a co-routine. When a co-routine is initially called by another co-routine, the called co-routine's stack frame is placed on top of the caller's frame on the stack. If a co-routine is not ever suspended, the frames associated with the co-routine are not copied to the heap. If a co-routine is suspended, at the first suspension, all the stack frames associated with the suspended co-routine, down to and including the driver stack frame are copied to the heap. Subsequent suspensions, however, do not result in previously-copied stack frames being copied again to the heap. When the co-routine is resumed, the driver routine only puts the leaf routine on the stack. Returning and throwing exceptions are handled by replacing the callee frame with the caller frame on the stack.

The module for efficient resumption of co-routines on a linear stack 106 may include one or more of the following: a compiler 114 such as a background compiler, a parallel compiler or an incremental compiler, a parser such as a background parser, parallel parser or incremental parser or a plug-in, a pre-processor, or an add-in or extension to an IDE, parser, compiler or pre-processor. The module for efficient resumption of co-routines on a linear stack 106 may be attached to, incorporated within or associated with a compiler such as a background compiler, a parallel compiler or an incremental compiler, a parser such as a background parser, parallel parser or incremental parser or a plug-in, a pre-processor, or an add-in or extension to an IDE, parser, compiler or pre-processor.

Caller 110 may represent a procedure, subroutine or a calling co-routine. A callee 112 can represent a called co-routine, procedure or subroutine. The module for efficient resumption of co-routines on a linear stack 106 may monitor calls between a caller 110 and a callee 112. The module for efficient resumption of co-routines on a linear stack 106 can perform processing to suspend and resume co-routines in a computer environment utilizing a single linear machine call stack that is itself not inherently capable of suspending and resuming co-routines. The module for efficient resumption of co-routines on a linear stack 106 may monitor co-routine processing. Only in response to detecting a first suspension of a co-routine (e.g., the called co-routine) a resume-able portion of the single linear machine call stack is saved in a separate data structure, such as a heap. The first time a co-routine is suspended, all of its stack frames down to and including the driver stack frame are copied into the heap. If, however, the co-routine is suspended again, its stack frames are not copied again into the heap. The resume-able portion of the single linear machine call stack for the calling co-routine and called co-routine can include a stack frame including a return address for the caller, a stack frame including a return address for the called co-routine and the stack frame for the driver routine.

In the case of a recursive co-routine call chain, the resume-able portion of the linear machine call stack may include all the stack frames including all the return addresses for all the recursively called co-routines to a depth d. The resume-able portion of the single linear machine call stack can be saved in a data structure such as but not limited to a heap data structure. The data structure in which the stack frames from the linear machine call stack are saved can be separate from the linear machine call stack.

When a suspension occurs, the resume-able part or portion of the linear machine call stack can be removed and a resumer stack frame (including the return address of the resumer) can be copied onto the linear machine call stack, such that when the co-routine is resumed, and control returns to the topmost stack frame on the call stack, control is transferred to resumer 108. When a called co-routine is resumed, only the stack frame including the return address for the called co-routine can be copied onto the single linear machine call stack without reconstituting all of the saved resume-able portion onto the single linear machine call stack. In response to detecting resumption of the paused co-routine (e.g., the called co-routine) the resumer stack frame on the linear machine call stack can be processed and resumer 108 can be called. In response to detecting the resumption for the called co-routine, the called co-routine can be executed, returning control to the resumer by returning control to the return address for the resumer placed on the single linear machine call stack. Resumer 108 can return control to a return address in the stack frame for the caller by copying the stack frame for the caller onto the call stack. That is, resumer 108 can copy only the topmost leaf frame to the call stack for the appropriate co-routine without reconstituting the entire call stack when the co-routine resumes. The process can continue until the entire call chain has completed. When a co-routine returns to its caller, the callee stack frame is replaced by the caller stack frame.

When an exception is thrown, in accordance with aspects of the subject matter disclosed herein, the exception can be caught, the callee's stack frame can be replaced by the caller's stack frame, and then the exception can be re-thrown.

Figure 2:
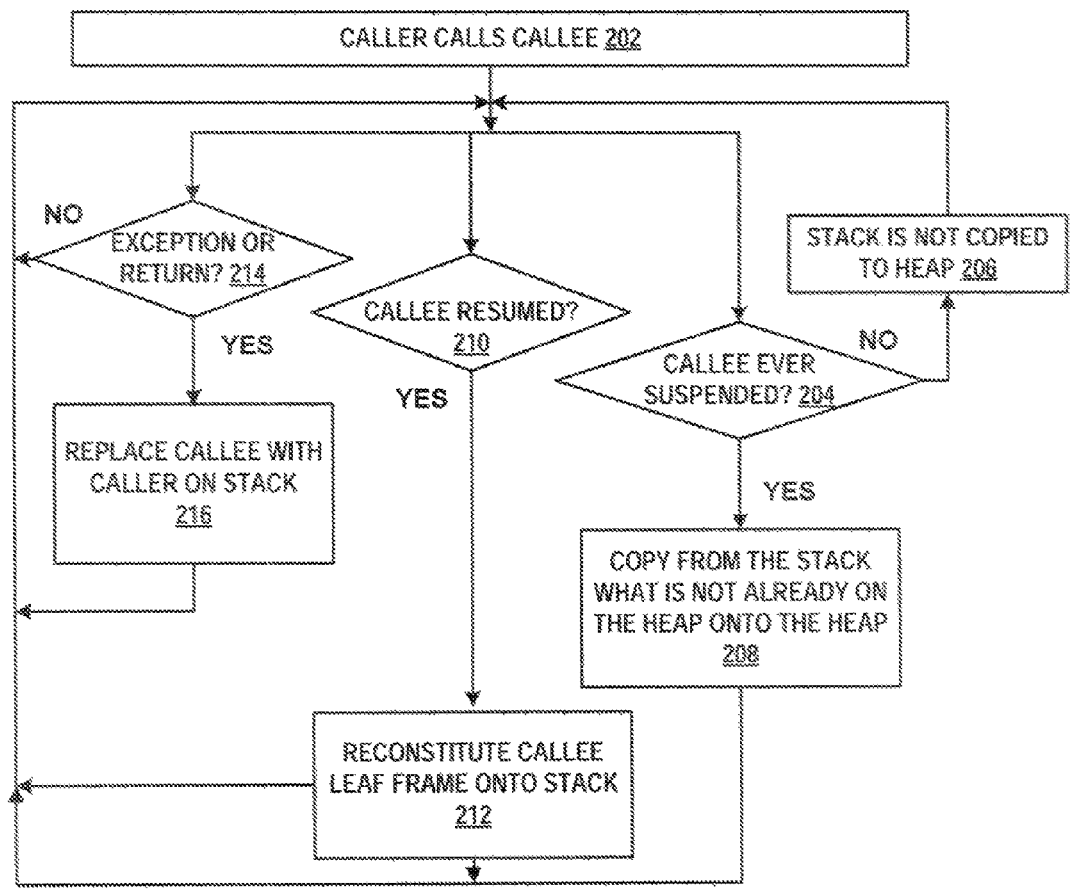
FIG. 2 is a flow diagram of an example of a method 200 for efficient resumption of co-routines on a linear stack in accordance with aspects of the subject matter disclosed herein as described with respect to FIG. 1.

FIG. 2 illustrates an example of a method 200 for efficient resumption of co-routines on a linear stack in accordance with aspects of the subject matter disclosed herein. At 202 a co-routine (caller) calls another co-routine (callee). If at 204 the called co-routine is never suspended, the stack is not copied to the heap (206). That is, the called routine's frame is placed on top of the caller's frame on the stack and is handled by traditional machine call stack processing. If at 204, a suspension of the called co-routine occurs, at 208 the resumeable portion of the machine stack is copied onto the heap if it has not been previously copied to the heap. The first time the callee is suspended, all the stack frames associated with the suspended co-routine, down to and including the driver stack frame are copied to the heap. Subsequent suspensions, however, do not result in previously-copied stack frames being copied again to the heap. A resumer stack frame is pushed onto the call stack. The resumer stack frame, when processed, returns control to a resumer instead of to the caller. When or if the callee resumes at 210, the resumer is called at 212 and the resumer reconstitutes only the leaf frame (the topmost stack frame) for the callee from the heap onto the stack at 212 and processing continues. At 214, if an exception is thrown or if the callee returns, at 216, the callee frame on the stack is replaced by the caller stack frame and processing continues.

For example, suppose the co-routine implements an iterator that produces a collection result on demand. The collection may be represented by a binary tree data structure in which each node in the binary tree includes a value comprising a member of the collection. To produce the elements of the collection in a designated order prescribed by the binary tree, the binary tree may be traversed by recursive calls of a co-routine. Suppose, for example, that the binary tree represents a collection of the elements 1, 2 and 3. To produce the elements 1, 2, 3 in that order, the root node of the binary tree would typically have a value of 2, the left child node of the root node could have a value of 1 and no left or right subtrees and the root node's right child node could have a value of 3 and no left or right subtrees. The iterator produces the value of the root node's left tree first, then the value is yielded from the root node and then the elements of the right tree are yielded out. This process makes use of recursive co-routines. After each element is yielded, the co-routine is paused until the next element of the collection is requested.

When the calling routine calls the iterator function on the binary tree, the address of the caller is pushed onto the stack. The iterator calls the first co-routine on the root of the binary tree. The address of the next instruction of the first co-routine is placed on the stack. A second recursive co-routine call is made to the left tree of the root node. The address of the second co-routine called on the left tree of the root node is placed on the stack. Because the left tree of the root node has no subtrees, no recursive call is made to the left child node of the left tree. The element of the collection stored in the left tree (1) is yielded. The co-routine called on the left node is suspended. The co-routine on the root is also suspended.

When the co-routine on the left child node of the tree is suspended, the call stack of 2 frames (the address for the co-routine called on the left root and the co-routine called on the root) is saved in the heap. A resumer frame is copied onto the stack. When the co-routine resumes because the client who asked for the elements of the collection asks for the next one, instead of taking both saved frames from the heap and putting them back on the stack, only the topmost frame corresponding to the co-routine call on the left tree (on the node with the 1 in it) is copied onto the stack. Hence, there is one frame on the stack where the frame on the stack corresponds to the co-routine that was called on the left node. The second call determines that the node with the one in it has no right trees.

The co-routine to which the result is to be returned is the co-routine that was called on the root node, but that frame was not copied back onto the stack so instead of doing a stack return as in the traditional model, the co-routine returns to the address on the resumer frame (which is the next frame on the stack). Hence, resumption is channeled through the resumer routine. The resumer determines the return address for the root and directs the result to be returned to that address. The co-routine called on the root node yields its value, (2) and suspends again. The next time the client asks for a value, the resumer is called again. The resumer puts the root frame on the stack because that was the one that was suspended from previously. The co-routine called on the root node is run it from the instruction after where it yielded its own value. Next a traditional recursive co-routine call is made on the right branch to yield out any values that are in the right subtree.

At this point there are three frames on the call stack: at the bottom is the resumer frame, above it is the frame for the co-routine called on the root and on top is the frame for the co-routine called on the right leaf. The right leaf determines that it has no left branch, and will yield out its own value (3) and suspend. Upon suspension the topmost two frames are stored in the heap and a resumer frame is copied onto the stack. When the client asks for another element, resumption occurs. The topmost frame directs processing to the resumer. The resumer places the frame corresponding to the right leaf on the stack. The co-routine called on the right leaf determines that it has no right subtree. It returns a result to the resumer saying that it is done. The resumer places the root frame on the stack. The co-routine on the root resumes. It determines that it is done and returns to the driver. The next frame on the stack is the return address of the caller. The caller receives the message that there are no more elements in the collection.

It will be appreciated that the above described method can be applied to co-routines with multiple entry points by yielding instructions to the resumer concerning which co-routine to run next. It will also be appreciated that the above describe process can provide support for asynchronous programming. Suppose, for example, an asynchronous routine reads a file in sections. The routine may execute in a loop, recursively calling another routine that reads a portion of the file. To avoid having a thread running all the time, the main routine can be suspended until the co-routine that reads a portion of the file finishes. The suspended main routine can be resumed when the co-routine that reads a portion of the file returns results. Both the asynchronous main routine and the co-routine that reads a portion of the file are suspended until a portion of the file returns. The thread coming back with the file content resumes the routine that requested the information, gives it the file content and it passes the content back to the main routine.

The process is repeated so that another section of the file is retrieved by another recursive call and so on. In this case, resumption is initiated by the operating system event that comes back with content from the file. In this scenario, when the operating system comes back with file content, it executes a call back to the resumer installed earlier on the stack. The resumer resumes the co-routine as described above by the latest leaf routine (the one reading sections of the file) back on the stack and executing it from where it got to. When the leaf routine finishes, it returns to the resumer and the resumer returns to the original caller. Execution continues until the next section of the file is requested at which time the called and calling routines are again suspended and so on.

Example of a Suitable Computing Environment

Figure 3:
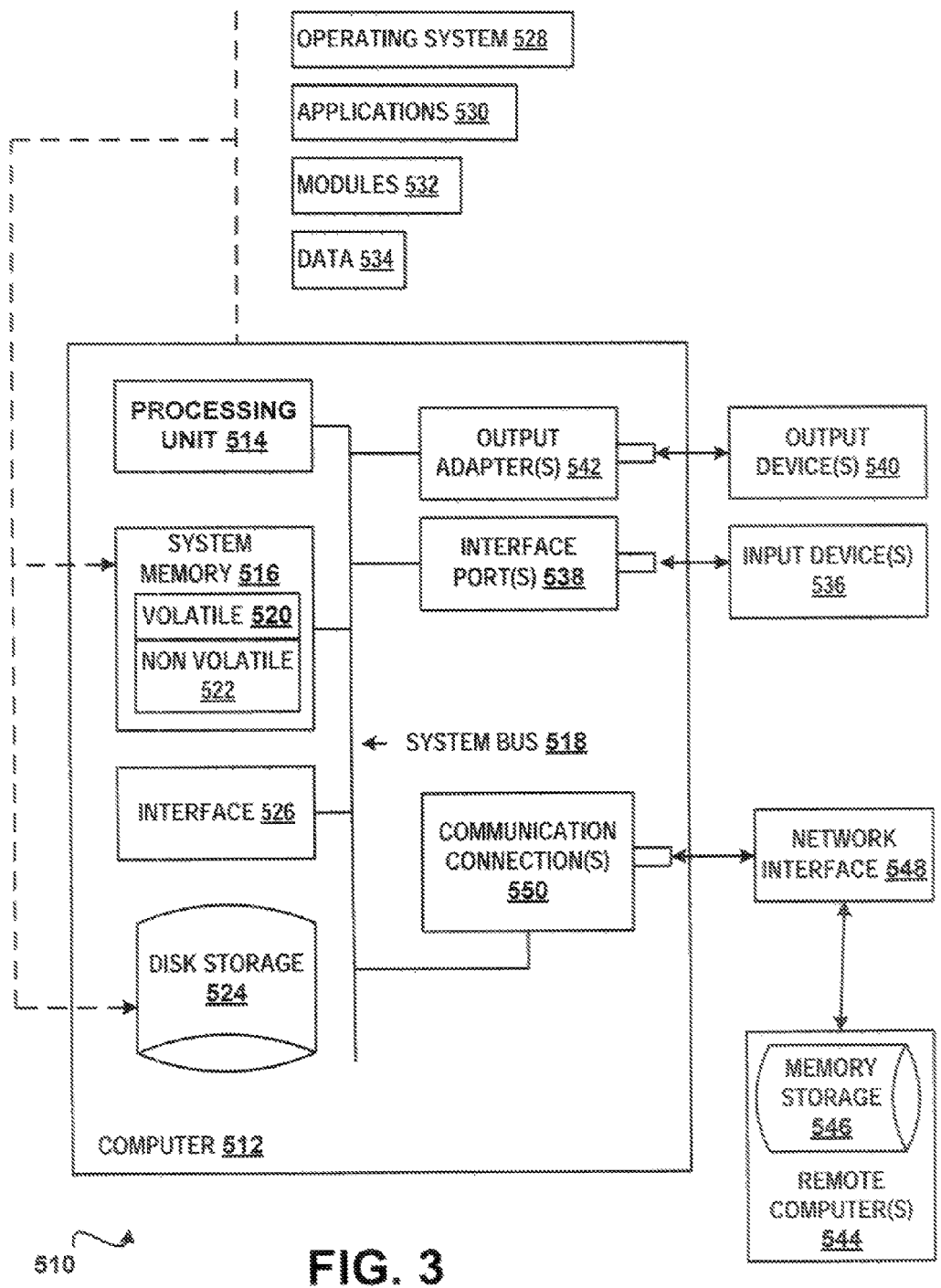
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
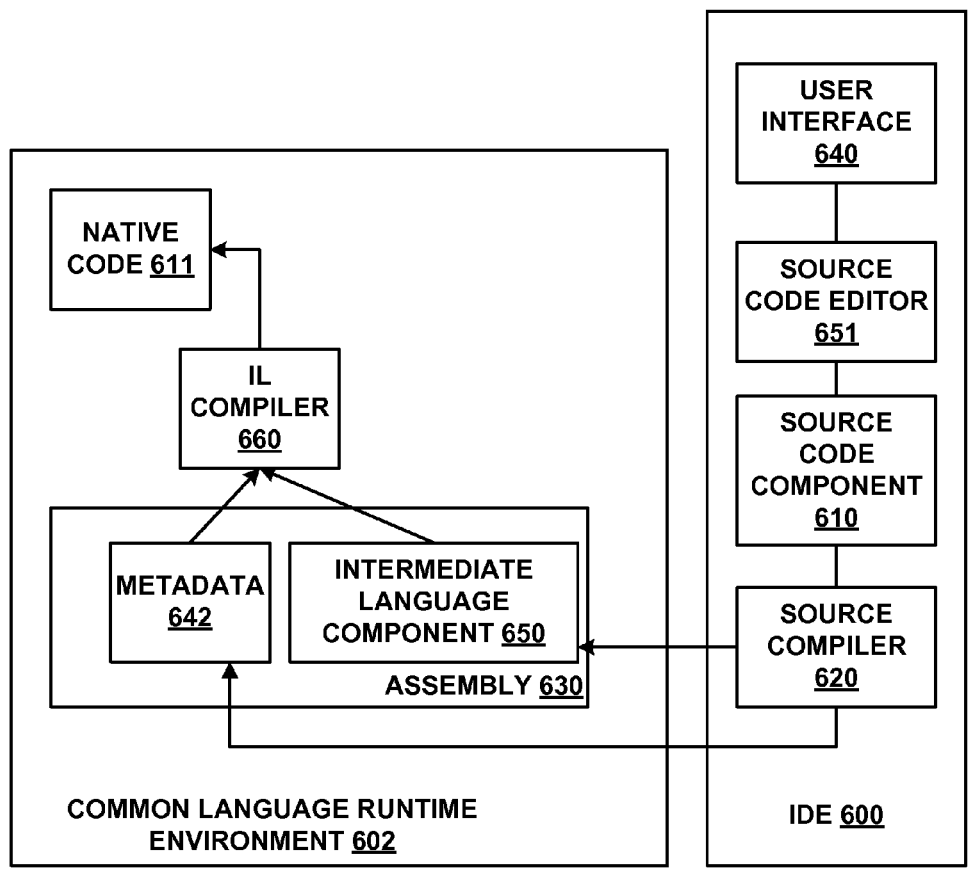
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a processor and a memory including a module configured to cause the processor to:
suspend and resume co-routines comprising a calling co-routine and a called co-routine in a computer environment utilizing a single linear machine call stack not inherently capable of suspending and resuming co-routines, wherein only in response to detecting suspension of the called co-routine, the module:
saves a resume-able portion of the single linear machine call stack not previously saved to a heap that emulates the single linear machine call stack but is separate from the single linear machine call stack such that the resume-able portion of the single linear machine call stack is only copied to the heap once, the resume-able portion of the single linear machine call stack comprising a stack frame for the calling co-routine, a stack frame for the called co-routine and a stack frame for a resumer;
removes the resume-able portion of the single linear machine call stack from the single linear machine call stack;
places a return address for a resumer that controls co-routine execution on the single linear machine call stack so that when the called co-routine is suspended it does not return to the calling co-routine but instead returns to the resumer;
and in response to detecting resumption of the called co-routine:
copies only the stack frame for the called co-routine onto the single linear machine call stack without copying all of the resume-able portion of the single linear machine call stack onto the single linear machine call stack.

2. The system of claim 1, wherein, in response to detecting the resumption for the called co-routine, control is returned to the resumer by returning control to the return address for the resumer placed on the single linear machine call stack, the resumer placing the stack frame for the called co-routine on the single linear machine call stack.

3. The system of claim 1, wherein the called co-routine implements an iterator in C#.

4. The system of claim 1, wherein the called co-routine implements asynchronous programming.

5. The system of claim 1, wherein in response to an exception being thrown, the stack frame for the called co-routine is replaced by the stack frame for the calling co-routine on the single linear machine call stack.

6. The system of claim 1, wherein resumption is initiated by the calling co-routine requesting additional information.

7. The system of claim 1, wherein resumption is initiated by return of information requested by the calling co-routine.

8. A method comprising:
suspending and resuming co-routines comprising a calling co-routine and a called co-routine in a computer environment utilizing a single linear machine call stack not inherently capable of suspending and resuming co-routines, wherein only in response to detecting suspension of the called co-routine, the computer environment:
saving a resume-able portion of the single linear machine call stack not previously saved to a heap that emulates the single linear machine call stack but is separate from the single linear machine call stack such that the resume-able portion of the single linear machine call stack is only copied to the heap once, the resume-able portion of the single linear machine call stack comprising a stack frame for the calling co-routine, a stack frame for the called co-routine and a stack frame for a resumer;
removing the resume-able portion of the single linear machine call stack from the single linear machine call stack;
placing a return address for a resumer that controls co-routine execution on the single linear machine call stack so that when the called co-routine is suspended it does not return to the calling co-routine but instead returns to the resumer;

and in response to detecting resumption of the called co-routine:

copying only the stack frame for the called co-routine onto the single linear machine call stack without copying all of the resume-able portion of the single linear machine call stack onto the single linear machine call stack.

9. The method of claim 8, further comprising:

in response to detecting the resumption of the called co-routine, reconstituting only the called co-routine stack frame from the heap to the linear machine stack.

10. The method of claim 9, further comprising:

implementing an iterator of a high-level programming language or implementing asynchronous programming.

11. The method of claim 8, further comprising:

in response to the called co-routine returning, replacing the stack frame of the called co-routine on the linear machine call stack with the calling co-routine's stack frame.

12. The method of claim 8, further comprising:

in response to throwing an exception, catching the exception, replacing the stack frame of the called co-routine with the calling co-routine's stack frame on the linear machine call stack and re-throwing the exception.

13. The method of claim 12, further comprising:

wherein resumption of the called co-routine is initiated by the calling co-routine requesting additional information from the called co-routine.

14. The method of claim 13, further comprising:

wherein resumption of the called co-routine is initiated by requested information becoming available to the called co-routine.

15. A hardware memory, comprising computer-executable instructions which when executed cause at least one processor to:

suspend and resume co-routines comprising a calling co-routine and a called co-routine in a computer environment utilizing a single linear machine call stack not inherently capable of suspending and resuming co-routines, wherein only in response to detecting suspension of the called co-routine, the processor:

saves a resume-able portion of the single linear machine call stack not previously saved to a heap that emulates the single linear machine call stack but is separate from the single linear machine call stack such that the resume-able portion of the single linear machine call stack is only copied to the heap once, the resume-able portion of the single linear machine call stack comprising a stack frame for the calling co-routine, a stack frame for the called co-routine and a stack frame for a resumer;

removes the resume-able portion of the single linear machine call stack from the single linear machine call stack;

places a return address for a resumer that controls co-routine execution on the single linear machine call stack so that when the called co-routine is suspended it does not return to the calling co-routine but instead returns to the resumer;

and in response to detecting resumption of the called co-routine:

copies only the stack frame for the called co-routine onto the single linear machine call stack without copying all of the resume-able portion of the single linear machine call stack onto the single linear machine call stack.

16. The memory of claim 15, comprising further computer-executable instructions, which when executed cause the at least one processor to:

resume the suspended co-routine, wherein the resumed co-routine returns to the resumer, and the resumer copies the stack frame for the caller onto the linear machine call stack.

17. The memory of claim 15, comprising further computer-executable instructions, which when executed cause the at least one processor to:

implement an iterator of a high-level programming language.

18. The memory of claim 16, comprising further computer-executable instructions, which when executed cause the at least one processor to:

support asynchronous programming.

19. The memory of claim 16, comprising further computer-executable instructions, which when executed cause the at least one processor to:

resume the suspended co-routine in response to the calling co-routine requesting additional information.

20. The memory of claim 15, comprising further computer-executable instructions, which when executed cause the at least one processor to:

resume the co-routine in response to return of requested information.

* * * * *